US006322876B1

(12) United States Patent
Lythgoe et al.

(10) Patent No.: US 6,322,876 B1
(45) Date of Patent: Nov. 27, 2001

(54) TRANSFER HAVING SOLVENT-ACTIVATED ADHESIVE LAYERS

(75) Inventors: Alan Lennox Lythgoe, Kent (GB); Dick J. van Heijningen, Alphen aan de Rijn (NL)

(73) Assignee: Trip Industries Holding B.V., Holland (NL)

( * ) Notice: Subject to any disclaimer, the term of this patent is extended or adjusted under 35 U.S.C. 154(b) by 0 days.

(21) Appl. No.: 09/141,855

(22) Filed: Aug. 28, 1998

(30) Foreign Application Priority Data

Aug. 28, 1997 (GB) ........................................ 9718238

(51) Int. Cl.$^7$ ........................ B32B 27/14; B32B 3/00

(52) U.S. Cl. ........................ 428/195; 428/343; 428/354; 428/914; 427/149

(58) Field of Search ........................ 428/195, 200, 428/201, 343, 354, 914; 427/149

(56) References Cited

U.S. PATENT DOCUMENTS 3,847,725 * 11/1974 Hochner ........................ 161/167
4,379,017 * 4/1983 Barta ........................ 156/238
4,399,178 * 8/1983 Barta ........................ 428/202
6,004,308 * 12/1999 Haddock ........................ 604/390

* cited by examiner

*Primary Examiner*—Bruce H. Hess
*Assistant Examiner*—B. Shewareged
(74) *Attorney, Agent, or Firm*—McDermott, Will & Emery

(57) ABSTRACT

A decalcamania or pressure-sensitive dry transfer is described in which at least one design indicium is supported on a temporary carrier sheet from which it is releasable by manipulation of the carrier sheet. The indicium carries a pressure-sensitive adhesive coating, the tack level of which is substantially reduced by the application of a tack-reducing substance so that the multiple sheets of the transfer material can be stacked without blocking. The adhesive can be re-activated prior to use by treatment with a solvent for the tack-reducing substance, such solvent being a non-solvent or poor solvent for the adhesive.

4 Claims, 1 Drawing Sheet

TRANSFER HAVING SOLVENT-ACTIVATED ADHESIVE LAYERS

Figure 1:
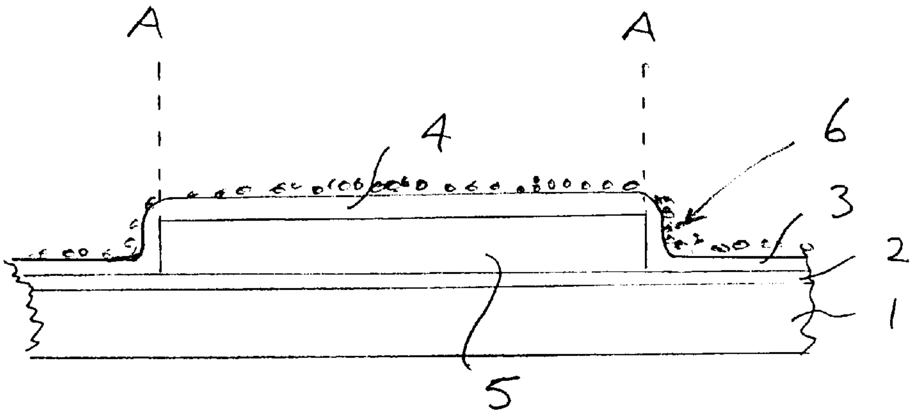

This invention relates to decalcamania or transfers in which one or more design indicia are supported on a temporary carrier sheet and are transferable to a substrate using a pressure-sensitive adhesive layer on the indicia.

Dry transfers of the above type are manufactured by printing onto a temporary carrier sheet and are over-printed with a pressure-sensitive adhesive. Because the nature of the carrier sheet is selected so that the indicia have a relatively poor adhesion to the carrier sheet, they can be transferred to a receptor surface under the influence of the tacky adhesive. Similarly, so-called water-slide transfers can be manufactured in which design indicia are printed onto a carrier sheet having a water-soluble surface coating, e.g. gummed paper. In preparation for use, the transfers are soaked in water, which releases them from the carrier sheet and adhered to a receptor surface. A pressure-sensitive adhesive layer on the indicia can be used to cause them to be bonded to the receptor surface. Both of the above kinds of transfers require the tacky adhesive layer to be protected from sticking to other carrier sheets or surface before the transfers are to be used.

In conventional practice, the transfers are interleaved with sheets which are coated with a material which easily releases from an adhesive surface, e.g. siliconised papers or films. Such siliconised sheets prevent the transfers sticking together when stacked or guillotined into smaller sizes, or delaminating or otherwise becoming unusable in storage or handling before the transfers are to be employed.

The siliconised paper or film is expensive, adds considerable weight to the product, and can be a problem if the level of the tack of the adhesive is relatively low and the paper becomes detached during such processes as the insertion of small transfers as novelties into other products, such as cereal packs.

Siliconised paper also presents an environmental problem because it must be separated from waste paper for recycling, since it interferes with paper-making processes.

It is an object of this invention to devise a transfer having a pressure-sensitive adhesive which does not require a siliconised paper or similar release material, but can be stored and handled without blocking or premature transfer.

According to the present invention there is provided a decalcamania in which at least one design indicium is supported on a temporary carrier sheet and is transferable to a substrate aided by pressure-sensitive adhesive on the indicium, said pressure-sensitive adhesive bearing a tack-reducing substance which enables several sheets of the decalcamania to be stacked without blocking, said tack-reducing substance being removable to restore tack to the adhesive by application of a differential solvent for the tack-reducing substance and the adhesive, said solvent being a non-solvent or poor solvent for tack inducing components of the adhesive and a good solvent for the tack-reducing substance.

The term "design indicium" as used in this specification includes a sign, figure, letter, picture or symbol. It may be formed from one ink or be a composite structure formed from two or more inks or ink layers.

The invention overcomes the problems of prior art pressure-sensitive transfers by application to the adhesive of a tack-reducing substance which is soluble in a solvent which is a non-solvent or a poor solvent for the adhesive. Conveniently, the tack-reducing substance is water-soluble since conventional components of pressure-sensitive adhesives, especially tackifiers, are not water-soluble. Also, water is always available to the user and is thus a convenient solvent for removing the tack-reducing substance and thus activates the adhesive.

One convenient way of carrying the invention into effect is to manufacture the transfer in the normal way up to coating or printing the adhesive onto the indicia. At this point, the surface of the adhesive is temporarily de-tackified by applying a tack-reducing substance to the exposed surface of the adhesive. The tack-reducing substance should not be soluble in or miscible with the adhesive, but should form a separate, superficial layer. In a currently preferred form of the invention, the tack-reducing substance is a solid material, e.g. a powder or crystalline material. When applied to the tacky surface, the solid material lies on the adhesive surface and prevents it bonding to another surface. The solid, powdery or crystalline tack-reducing substance is preferably water-soluble, and can be washed away by soaking the transfer or holding it under a stream of water.

Typical solid, water-soluble detackifiers are starch, modified starches, sugars, including natural and synthetic sugars, and cellulose derivatives such as alkyl- or alkoxy-celluloses and hydroxyalkyl celluloses.

The tack-reducing substance may be coloured so that the user is prompted to wash the adhesive layer until a colour change indicates that the tack-reducing substance has been sufficiently removed, and the tack of the adhesive restored.

It is not essential to apply the tack-reducing substance as a solid but it can, instead, be applied as a coating containing the tack-reducing substance. After drying, the tack reducing substance is deposited as a film (which may be continuous or in discrete areas) or as particles on the surface of the adhesive. In this case, it is often preferable for the coating to be formulated using solvents, such as alcohols, which are water-miscible but are not solvents for the pressure-sensitive adhesive.

An alternative way of rendering the adhesive temporarily non-tacky is by transferring a film of the tack-reducing substance from a carrier sheet to the adhesive surface. The film is generally water-soluble and is removed by washing with water to restore the tack level of the adhesive.

It will be understood that instead of activating by water as described, any solvent could be used which washes away the non-tackifying layer, but which leaves the tacky layer of adhesive. For example, if the adhesive were not soluble in alcohols, then an alcohol soluble layer could be used and removed with an alcoholic solvent.

The transfers in accordance with the invention may be dry transfers. However, the invention is especially useful in the manufacture of water-slide transfers which are coated with a pressure-sensitive adhesive on the exposed surface of the design indicia.

In the case of water slide transfers, it is normal and necessary to soak in water to release the transfer so there is no extra operation involved in preparing the transfer for application, except for rubbing the water-soluble layer from the surface of the pressure-sensitive adhesive.

A further means of applying the water-soluble layer is by use of a printing technique, e.g. ink-jet printing. In this case, the printing can consist of a single non-coloured layer over the area of the pressure-sensitive layer or, in addition or alternatively, a coloured layer or layers can be printed.

With this variant, the adhesive layer can be covered by the water-soluble layer for the primary purpose of obscuring the tackiness of the adhesive. This has the further advantage of enabling the water-soluble layer to be informative or decorative, or capable of having additional qualities. It is, for example, capable of being used as a method of marking paper by first wetting the paper, and then putting the water-soluble layer in contact with it and thereby transferring part or all of the water-soluble layer. When the water-soluble layer is removed, the coloured layer will have disappeared, leaving the pressure-sensitive layer visibly cleaned.

Another alternative is that the pressure-sensitive layer can be covered with a water-soluble powder layer which, for example, could be printed by ink jet printing, using water-based inks to provide information or decoration.

Furthermore, the water-soluble layer can be applied by hot melt applications using fine nozzles to express the molten water-soluble composition over the pressure-sensitive adhesive coating.

Referring to the drawing (FIG. 1), a flexible carrier sheet 1 of coated paper or a film may be coated with an adherent thin release layer 2. On the surface of the release layer one or more indicia 5 is printed in a suitable ink. Coated over the indicia 5 and extending over the surface of the release layer is a coating of a pressure-sensitive adhesive 3. This adhesive has an intrinsically moderate to high tack so that it forms a bond of sufficient strength with a receptor substrate to be strongly attached thereto. The surface of the adhesive is dusted with a layer of a tack-reducing substance such as particles of starch or a cellulose derivative. The amount of tack-reducing agent is sufficient to reduce the surface tack to the point where multiple sheets do not block when stacked on top of each other. In use, the surface of the adhesive is first washed with water to remove the starch or starch derivative. After activation of the adhesive, the surface of the portion 4 of adhesive is pressed into contact with a receptor surface and a strong bond is developed which, on manipulating the carrier sheet 1, causes the adhesive to shear around the periphery of the indicia. Thus, the indicia 5 is lifted from the carrier sheet leaving the remaining adhesive 3 attached to the carrier sheet.

The following Examples (in which all parts are by weight) will illustrate the invention.

EXAMPLE 1

Waterslide temporary tattoo

Waterslide paper is printed with a design by screen process or by offset litho, using non-oxidising inks free from heavy metals or other injurious materials to the skin. It is normal to use heat set offset litho inks for the design. These inks are solutions of relatively high melting point resins which dry by evaporation.

The non-oxidising ink was prepared by dispersing 10 to 25 parts by weight of pigments in a varnish formed by dissolving 40 to 70 parts by weight of pentaerythritol esters of rosin in 30 to 60 parts by weight of an aliphatic hydrocarbon solvent or solvent mixture having a boiling range of 260 to 290° C. After adjustment to a suitable viscosity, designs were printed onto the waterslide paper by offset litho.

A very flexible coating is applied by screen process over the design area in order to hold the design together when transferring, and to provide resistance to wear and washing of the design after application to the skin. These coatings can be made from synthetic rubber-type materials such as polystyrene-polyisoprene copolymers, chlorinated rubbers, ethylene vinyl acetate copolymers etc.

An example of a suitable formulation for the clear flexible coating is as follows:

1. 5~6 parts of polyisoprene polystyrene resin (available as ‘Carriflex’ from Shell Chemicals).
2. 4~6 parts of chlorosulphonated polyethylene (obtainable from DuPont under the trade name Hypalon).
3. 5~6 parts of a copolymer of ethylene and vinyl acetate (sold by DuPont under the trade name Elvax).
4. 20~25 parts of talc.
5. 60~65 parts of aromatic hydrocarbon solvent (available as Shellsol A from Shell Chemicals).

The above ingredients 1 to 4 were dispersed into the solvent and screen printed over the graphic design to form a strong, flexible clear layer.

A pressure-sensitive adhesive is applied over the flexible coating to adhere well to the skin. Such adhesives may consist of non-water-soluble compositions such as polyvinylisobutyl ethers or polystyrene polyisoprene polymers tackified with resins such as rosin derivatives. These adhesives are normally modified to reduce their tackiness with extenders and waxes.

A suitable adhesive has the following formulation:

1. 15.5 parts polyvinyl isobutyl ether (M.W. approx. 30,000).
2. 31 parts polyvinyl isobutyl ether (M.W. approx. 60,000).
3. 4 parts saponified ester wax derived from Montan wax (available as OP wax from BASF).
4. 2.8 parts finely divided silica.
5. 46.7 parts of aromatic hydrocarbon solvent (Shellsol A).

Ingredients 1 to 4 above were dissolved or dispersed into the solvent.

The pressure-sensitive adhesive is applied by screen printing and the solvents evaporated by air drying or by forced hot air drying, following which the adhesive is rendered non-tacky by overspraying with a powder consisting of fine particles of starch, or sugar, or glucose, or similar materials which are freely water-soluble.

The sugar or starch coated adhesive area can be printed with instructions for use or advertising or as a further design enhancement. This printing step may be carried out using a water-soluble ink and is conveniently applied by ink jet printing.

The sheets of transfers thus produced can be further processed by stacking and guillotining and further packaged unprotected into bags or inserted into magazines or packages of products such as single or multiple items.

In order to apply the transfer, the whole transfer is immersed in water and the water soluble materials wiped from the surface of the transfer before applying the exposed, activated adhesive to the skin and removing the backing paper in the normal fashion.

EXAMPLE 2

For general purpose application of water slide transfers using pressure sensitive adhesives as the means of adhering the design to the substrate.

The adhesion of normal waterslide transfers to plastics surfaces is very poor since the adhesion of the gums used is not inherently high and they lack flexibility and bond strength.

In such cases it is best to use a pressure sensitive adhesive over a design held by an overall layer of strong, flexible, polymer composition and coated with a pressure sensitive adhesive. The system is similar to Example I except that the same degree of flexibility is not necessarily required and a wider range of polymers can be used in both inks and the layer carrying the design.

A great variety of adhesives can be used provided that the adhesive is not water soluble and adhesives such as for example those used in example 1 except that the adhesive would be used without modification with tack reducing agents.

The adhesives are applied by screen process in register with the design holding layer and after drying are powdered with starch, cellulose derivatives, natural or synthetic sugars, by either passing the sheets through a trough containing the powder or by spraying the dry powder on the sheet.

Again the sheets can then be further processed by stacking and cutting and packing for storage and delivery.

The transfers are applied by immersing in water and removing the water soluble powder, applying the pressure sensitive adhesive side to the substrate and sliding away the waterslide paper.

EXAMPLE 3

A dry transfer consisting of a temporary carrier sheet, for example of polyethylene, polypropylene, polystyrene etc. is printed with a releasable ink layer as is well known in transfer technology, the ink is overprinted with a pressure sensitive adhesive as described in Example 1.

After drying the adhesive the surface tack is eliminated by spraying with dry water soluble starch or sugar in the form of a fine powder.

No silicone interleaving paper is then required for further processing or storage.

The dry transfer is prepared for use by first wiping the starch or sugar powder away with water when the adhesive is again exposed.

EXAMPLE 4

A carrier sheet of polyester is coated with a release coating of for example poly methyl vinyl ether maleic anhydride and then coated or printed with a plastisol consisting of clear or coloured vinyl chloride copolymer dispersed in a plasticiser.

A pressure sensitive adhesive of the kind described in Example 1 is applied by coating or screen process printing overall. After drying, the tacky adhesive is rendered non-tacky by spraying with a water soluble powder consisting of starch or sugar.

The transfer can then be further processed as above and does not require the protection of a silicone interleaving paper during storage.

The tack of the adhesive is regained by washing away the powder coating. The transfer can then be attached by the tacky adhesive to the substrate and the polyester stripped away.

This type of product is very useful in the preparation of blocks of colour which can be scribed after application using a computer-controlled cutter which will cut the layer into patterns or words or sequences of letter or numbers for use say in vehicle number plates.

In this case the assembly is wetted before being passed through a roller and pressed against the substrate forming the background of the vehicle number plate.

In general this is a product suitable for the manufacture of one off signs etc.

The product can be in sheet form but might also easily be in the form of reels of any width.

The plastisol can be clear or coloured and could be pre printed or post printed by a variety of printing methods.

EXAMPLE 5

Water slide transfers as for example those in examples 1 and 2 can be processed to be transferred using the pressure sensitive method and can be provided with a water soluble protective layer by coating the layer using a solution of a water soluble material.

In this case it is preferred that the water soluble polymer is also soluble in a solvent other than water for example an alcoholic solvent such as isopropyl alcohol or glycolic solvent such as ethyl glycol or acetone or methyl pyrrolidone etc. The coating can be applied by reverse roll coating flexo printing or screen process printed and when dry the pressure sensitive adhesive is effectively masked.

The transfers can be made ready by immersing in water or by washing the water soluble polymer from the surface of the adhesive.

Suitable polymers for such use are for example polyvinyl vinyl ether/maleic anhydride, or cellulose derivatives such as hydroxypropyl cellulose, e.g. Klucel (Hercules Powder Co).

EXAMPLE 6

As for example 5 except that the transfers are normal dry transfers consisting of a temporary support printed with indicia having low adhesion to the temporary support and further printed with a pressure sensitive adhesive to effect transfer to the final support.

These transfers can be coated with a solution of a water soluble polymer from a solvent solution and the water soluble polymers removed by washing immediately prior to application.

EXAMPLE 7

The transfers either of dry or waterslide type having a pressure sensitive layer can be masked by using coloured water soluble polymers which can be deposited by for example the ink jet process.

The layer can be colourless but might also be coloured for the purpose of hiding the underlying design until wetted, the ink jet might also be applied in more than one colour in the form of patterns or designs to give further value in use.

The multi-colour printed water soluble layer may be gently wetted and itself transferred as a design onto paper before exposing the pressure sensitive layer for the normal application as a transfer.

EXAMPLE 8

The waterslide or dry pressure sensitive transfers can be deactivated by putting the adhesive into contact with preprinted and dried water soluble layers coated or printed onto a temporary support. Such layer using polyvinyl ether/maleic anhydride or Klucel type inks printed from solvent solutions can be transferred dry onto the surface of the pressure sensitive adhesive.

The dry layer sticks only in the area of the pressure sensitive adhesive and when the temporary support of the water soluble ink layers is removed the pressure sensitive adhesive is masked by the transferred design.

It will be appreciated that variations are possible in the manufacture of transfers in accordance with the invention. For example, the pressure-sensitive adhesive may be applied to the design indicia by any conventional technique, e.g. printing, coating using rollers or doctor blades or by extrusion.

The tack-reducing substance can also be applied to the pressure-sensitive adhesive by any convenient method. where it is solid, powdery material it can be distributed over the adhesive surface, e.g. by spraying, brushing, curtain-coating, or using rollers. When in the form of a solution or dispersion, any liquid coating technique may be used.

What is claimed is:

1. A transfer, which is a water-slide transfer, in which at least one design indicium is supported on a temporary carrier sheet and in which said design indicium is transferable to a substrate aided by pressure-sensitive adhesive on the indicium, said pressure-sensitive adhesive bearing a tack-reducing substance which enables several sheets of said transfer to be stacked without blocking, said tack-reducing substance being removable to restore tack to the adhesive by application of a differential solvent for the tack-reducing substance and the adhesive, said solvent being a non-solvent or poor solvent for tack inducing components of the adhesive and a good solvent for the tack-reducing substance, and said indicium being releasable from the carrier sheet at least in part by soaking in water.

2. A transfer, in which at least one design indicium is supported on a temporary carrier sheet and in which said design indicium is transferable to a substrate aided by pressure-sensitive adhesive on the indicium, said pressure-sensitive adhesive bearing a tack-reducing substance which enables several sheets of said transfer to be stacked without blocking, said tack-reducing substance being removable to restore tack to the adhesive by application of a differential solvent for the tack-reducing substance and the adhesive, said solvent being a non-solvent or poor solvent for tack inducing components of the adhesive and a good solvent for the tack-reducing substance, and said tack-reducing substance having been applied to the adhesive as a solution or dispersion that has been dried to leave a tack-reducing coating on the exposed surface of the adhesive.

3. A transfer, in which at least one design indicium is supported on a temporary carrier sheet and in which said design indicium is transferable to a substrate aided by pressure-sensitive adhesive on the indicium, said pressure-sensitive adhesive bearing a tack-reducing substance which enables several sheets of said transfer to be stacked without blocking, said tack-reducing substance being removable to restore tack to the adhesive by application of a differential solvent for the tack-reducing substance and the adhesive, said solvent being a non-solvent or poor solvent for tack inducing components of the adhesive and a good solvent for the tack-reducing substance, said the tack-reducing substance comprising a film, which is transferred to the adhesive surface from a temporary carrier, the film being soluble in the differential solvent to activate the adhesive.

4. A transfer according to claim 3, in which the tack-reducing substance is soluble in water or in a water-miscible solvent.

* * * * *